Oct. 29, 1968               D. S. LOWE               3,408,497

INFRARED SCANNING SYSTEM USING FIBER OPTICS

Filed Dec. 6, 1965

INVENTOR.
DONALD S. LOWE

BY
James L. O'Brien
ATTORNEY

United States Patent Office 3,408,497
Patented Oct. 29, 1968

3,408,497
INFRARED SCANNING SYSTEM USING FIBER OPTICS
Donald S. Lowe, Ann Arbor, Mich., assignor to The Bendix Corporation, a corporation of Delaware
Filed Dec. 6, 1965, Ser. No. 511,932
10 Claims. (Cl. 250—83.3)

ABSTRACT OF THE DISCLOSURE

An infrared scanning system having a lens system for providing a focused infrared image in combination with a plurality of optical fibers to scan the image by moving one end of each fiber sequentially across the image thereby providing a light signal at the other ends representing the radiation level variation of the image along the scan lines. Particularly, optical fibers are mounted axially spaced in a spoke-like fashion on a scanning wheel such that the wheel may be rotated with the outer ends of the fibers sequentially receiving axially spaced portions of the image.

---

This invention relates generally to infrared detecting systems and more particularly to an infrared scanner especially suited for use with target tracking apparatus or the like.

In infrared tracking of low radiation targets, a large aperture or field of view is desirable to achieve early target acquisition and effective tracking. However, with infrared tracking systems the large aperture requirement precludes practical use of conventional scanning techniques. Oscillating or rotating mirrors are impractical due to the large mirror displacement and high scanning speeds that would be incurred. Additionally the scan motion produced by oscillating mirrors would be sinusoidal producing non-uniform scanning velocity and line spacing. Scanning by a Nipkow disc would require a large diameter disc and large F number optics and would be so inefficient as to negate the whole purpose of having a large aperture optical system.

Thus the objects of the present invention are to provide an improved infrared scanning system that is efficient and that can be used to achieve effective infrared tracking.

Further objects of the present invention are to provide an infrared scanning system that has a large field of view; that requires only small size detectors; and that is capable of scanning an infrared image onto an infrared detector with low F number optics.

Other objects, features and advantages of the present invention will become apparent in connection with the following specification, the appended claims and the accompanying drawings in which:

Figure 4:
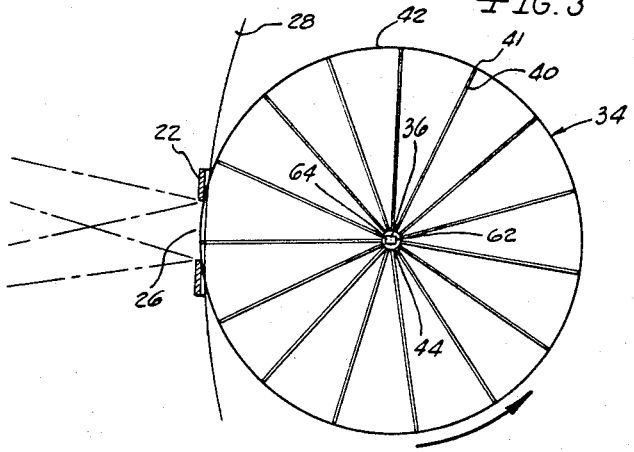
FIGURE 4 is a top view of the scanning wheel illustrated in FIGS. 2 and 3.

Referring to the drawings in greater detail, infrared radiation illustrated by arrows 10 is received and collected by an infrared optical collecting system 12 and is focused as an image by the system 12 at an infrared scanning apparatus 14. In general the scanning apparatus 14 scans the image in successive lines and devlops an infrared video signal which varies in accordance with radiation level variations along the scanning lines. The video signal developed by the scanning apparatus 14 is applied to a recorder and monitor 16 and also to tracker electronics 18. In response to the infrared video signal the tracker electronics 18 develops an error signal representing a target displacement on the image from a predetermined target location and the error signal is applied to positioning servos 20 which reorient the collecting system 12 to maintain the system on target. The tracker electronics 18 per se is constructed in accordance with known techniques that are used in electronic trackers of the type known as TV trackers for visual tracking systems. The collecting system 12 includes a forty-five degree reflector 22 and a spherical collecting mirror 24. In the preferred embodiment, the reflector 22 has a field aperture 26 and serves as an aperture stop, although a separate aperture stop can be used. Mirror 24 focuses radiation 10 through aperture 26 at an image plane 28 which is curved in horizontal section as illustrated in FIG. 4. Other optical collecting systems can also be used to form an infrared image to be scanned by a scanning apparatus of the present invention. Disposed behind the aperture 26 and generally behind the image plane 28 is a rotary scanning wheel 34 which is rotated about a vertical axis 36 by a drive motor 38.

Figure 5:
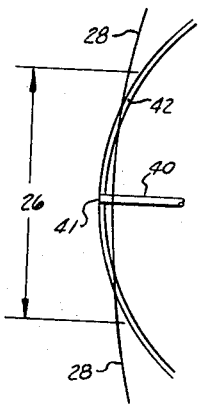
FIGURE 5 is a schematic view of the image plane of the collecting system and the outer periphery of the scanning wheel to illustrate compensation for curved motion of the optical fibers.

The scanning wheel 34 comprises fifteen optical fibers 40 arranged in a generally spoke-like configuration. Fibers 40 are supported at their radially outer ends 41 by a rim 42 which defines an outer periphery of wheel 34. Radially inner ends 43 of the fibers 40 are supported on a ring 44 which defines an inner radius of the wheel 34. The outer ends 41 pass through rim 42 for illumination at the aperture 26 and are equally spaced circumferentially around the rim 42 in different horizontal planes spaced vertically from the plane of adjacent fibers in a direction along the rotating axis 36 a distance equal to the fiber diameter. With this arrangement beginning with an uppermost fiber 50, the outer ends of the fibers 40 define a generally helical path illustrated by a dashed line 46 around rim 42. The helical path 46 terminates after one convolution with a lowermost fiber 52 so that the vertical displacement between fiber 50 and fiber 52 defines upper and lower vertical scanning limits as illustrated by lines 56, 58. Rim 42 is generally tangential to the image plane 28 and in the preferred embodiment the scanning wheel 34 is disposed slightly in front of the image plane 28 at the center of aperture 26 for paraxial rays and slightly behind the image plane 28 at the boundary of aperture 26 for rim rays as illustrated in FIG. 5 to compensate for a slight defocusing effect due to a difference in curvature between wheel 34 and the image plane 28. At the inner radius of wheel 34 defined by ring 44 the inner ends 43 of all of the fibers 40 lie in a common horizontal plane 60 perpendicular to the rotational axis 36. Within the ring 44 at the horizontal plane 60 is an infrared detector 62 which has an effective sensing area 64 facing toward the aperture 26. Detector 62 is stationary to receive radiation through each of the fibers as they pass the field aperture 26 when wheel 34 rotates. The video signal developed by detector 62 is connected by leads 66 to suitable amplifiers (not shown) and then to the tracker electrons 18 and the recorder and monitor 16.

The resulting scan is a simple horizontal line by each of the fibers 40 with successive lines progressing in a vertical scan direction through one scanning frame as wheel 34 makes one revolution. Thus for rotation of wheel 34 in a counterclockwise direction as viewed in FIG. 4 the first scan line is generated by fiber 50 and scanning progresses downwardly over aperture 26 to the last frame line which is generated by fiber 52 with vertical retrace between fibers 52, 50. Synchronizing signals for the tracker electronics 18 and the recorder and monitor 16 are generated by conventional means (not shown). Since the detector 62 is located at the inner radius defined by ring 44, the linear displacement per scan line of each fiber at the detector is considerably less than the displacement of the outer end 41 of each fiber along the scanning lines at the image plane 28. The instantaneous field of view of detector 24 and thus the resolution of the scanning apparatus is determined by the diameter of the optical fibers 40. This high resolution together with high detector efficiency can be achieved by using a reasonably small detector, for example, a detector having an effective sensing area 64 just several times the fiber diameter.

By way of illustration and not for purposes of limitation assuming that a field of view of five degrees is desired with resolution of approximately one milliradian at a frame rate of 10–30 frames per second. For an F/2.5 optical system having an entrance aperture diameter at mirror 24 of eight inches and a focal length of twenty inches between the mirror 24 and the image plane 28, the radius of the image plane 28 will be twenty inches. To achieve a field of view of five degrees the field aperture 26 will have a width of 1.75 inches. For this collecting system the diameter of each optical fiber 40 will be 0.5 millimeter to achieve the desired resolution of one milliradian. Using fifteen of the fibers 40 on a twelve inch diameter wheel, each fiber will be approximately six inches long and the outer ends 41 of each fiber 40 will be spaced 2.5 inches circumferentially from adjacent fibers. Based on the aperture width of 1.75 inches and the circumferential spacing of 2.5 inches the scanning duty cycle of wheel 34 at aperture 26 will be 0.7. Based on this duty cycle and a 0.5 millimeter fiber, the inner ends 43 of the fibers 40 will be spaced circumferentially of ring 44 a distance of 1.65 millimeters from center to center with a radius at ring 64 of four millimeters. Detector 62 will have an effective sensing area 44 of 1.65 millimeters in width, approximately equal to circumferential spacing between the inner ends 43 of fibers 40 or 3.3 times the effective scanning aperture formed by each of the fibers. The fibers may be formed of $As_2S_3$ in accordance with known fiber optics design techniques. The detector 24 should have detectivity $D^*_{3-4}$ average of $2 \times 10^{10}$ cm. c.p.s.$^{1/2}$/watts and a bandwidth of 30,000 c.p.s. Compared with other scanning techniques the scanning apparatus of the present invention is nearly perfect relative to an idealized system having the same F number.

Figure 1:
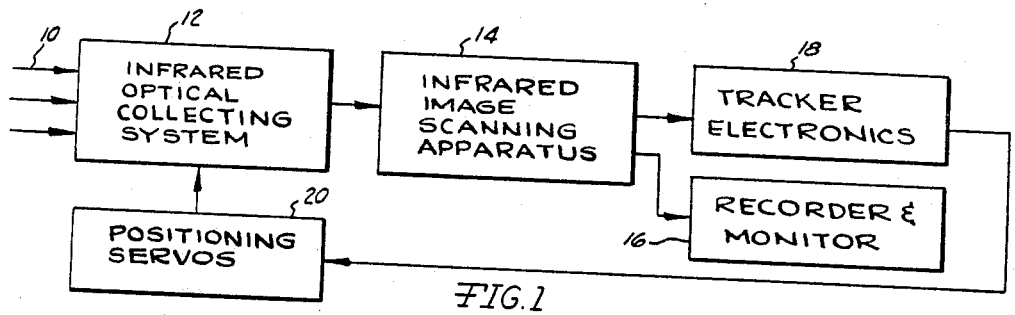
FIGURE 1 is a block diagram of an infrared tracking system which incorporates an infrared image scanning apparatus of the present invention.
Figure 2:
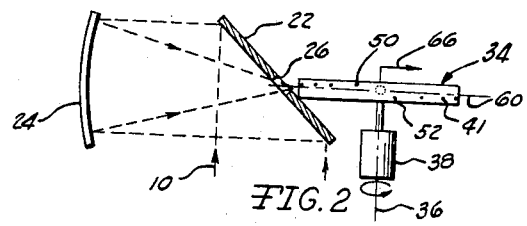
FIGURE 2 is a schematic view of an optical collecting system and an optical fiber scanning wheel of the present invention for scanning an image developed by the collecting system.
Figure 3:
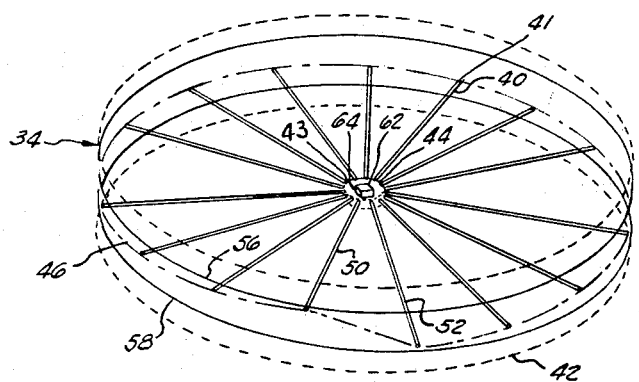
FIGURE 3 is a perspective view of the scanning wheel with support portions of the wheel removed to illustrate a helical configuration of the optical fibers.
Figure 6:
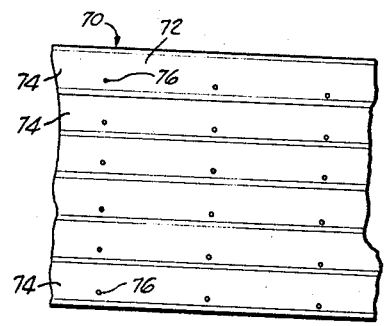
FIGURE 6 is a fragmentary view of another scanning wheel of the present invention where six fiber optic arrays are stacked to achieve a larger scanning height.

The scanning apparatus described hereinabove is for a single detector 62 generating fifteen scan lines per frame with a frame width across aperture 26 of five degress. To increase the height of the scanning frame, the number of scanning lines and thus the number of scanning fibers must be increased. Referring to FIG. 6, a fragmentary surface development of a modified scanning wheel 70 at an outer rim 72 illustrates one technique for increasing the height of the frame without increasing the diameter of the scanning wheel. The scanning wheel 70 comprises an array of six stacked sets 74 of fifteen optical fibers 76 in each set to achieve a 5° x 5° field of view. Each of the fiber sets 74 has a fiber configuration identical to the configuration of fibers 40 in wheel 34 (FIGS. 2–4). A separate infrared detector is used with each set 74.

One important advantage of the present invention is that scanning onto the detector is accomplished with low F number optics. It is also possible to achieve an F number optics that is actually smaller than the F number of the collecting system 12 by using tapered optical fibers that converge toward the detector or by re-imaging the outputs of the fibers onto the detector with a high speed lens. A decrease in the F number can improve the noise equivalent flux density of the system without otherwise substantially impairing the performance of the system.

Although the scanning wheels (34, FIGS. 2–4; 70, FIG. 6) have been described and disclosed for scanning an infrared image onto a detector, it will be apparent that a scanning apparatus, essentially operating in reverse from the scanning apparatus 14 described hereinabove, can be used to monitor the output of the scanning apparatus. With a scanning wheel having optical fibers designed for light transmission, a glow modulator light source can be used in place of the detector and a phosphorescent screen in place of the field aperture 26. The video signal from the detector 62 can then be used to modulate the light source and provide a visual image on the phosphorescent screen.

It will be understood that the infrared scanning system herein disclosed and described is presented for purposes of explanation and illustration and is not intended to indicate limits of the present invention the scope of which is defined by the following claims.

The embodiments of the invention in which an exclusive property or privilege is claimed are defined as follows:

1. In an infrared scanning system comprising optical means for collecting infrared radiation and for focusing a steady infrared image at an image plane of said optical means, means for scanning said image in lines to develop an electric signal representing radiation level variation of said image along said scan lines comprising a plurality of obliquely disposed optical fibers operable in an infrared spectrum to transfer infrared energy longitudinally along said fibers and means for moving one end of each fiber across said image to scan one line on said image as each fiber moves across said image.

2. The system set forth in claim 1 wherein said means for moving one end of each fiber across said image comprises a support member and means for rotating said support member, said fibers being mounted on said member in a generally spoke-like configuration with radially outer ends of said fibers defining a generally cylindrical surface and with the outer end of each fiber being spaced circumferentially of said surface from the outer end of adjacent fibers.

3. The system set forth in claim 1 wherein said means for moving one end of each fiber across said image comprises a support member and means for rotating said support member, said fibers being mounted on said member in a generally spoke-like configuration with radially outer ends of said fibers defining a generally cylindrical surface and with the outer end of each fiber being displaced longitudinally of said surface from the outer end of adjacent fibers.

4. The system set forth in claim 1 wherein said means for moving the outer end of each fiber across said image comprises a support member and means for rotating said support member, said fibers being mounted on said member in a generally spoke-like configuration with the outer ends of said fibers defining a generally cylindrical surface and with the outer end of each fiber displaced longitudinally and circumferentially of said surface from the outer end of adjacent fibers in a generally helical path on said surface.

5. The system set forth in claim 4 wherein said support member is rotatable about an axis generally parallel to said image plane and said fibers are mounted on said support with inner ends of said fibers intersected by a common plane that is perpendicular to said axis.

6. The system set forth in claim 5 comprising a single infrared detector disposed adjacent the inner ends of said fibers in fixed relation to said image and operative in response to radiation from fibers in one convolution of said path to develop said electrical signal.

7. The system set forth in claim 1 wherein said means for moving one end of each fiber comprises a support member and means for moving said support member past said image in a direction generally parallel to said image plane and said fibers are mounted on said support member with said one end of each fiber displaced in said direction from said one end of adjacent fibers.

8. The system set forth in claim 1 wherein said means for moving said one end of each fiber across said image comprises a support member and means for moving said support past said image in a direction generally parallel to said image plane and said fibers are mounted on said support member with the other end of each fiber intercepted by a common plane generally perpendicular to said image plane.

9. An infrared tracking system comprising a directive infrared radiation collecting system for developing an infrared image, servo means for orienting said collecting system, means for scanning said image in lines to develop an electrical signal representing radiation level variations of said image along said scan lines, electronic tracking means responsive to said electrical signals to provide an error signal representing a displacement of a target on said image from a predetermined location on said image, and servo means operable in response to said error signal to orient said collecting system and maintain said collecting system on said target, said scanning means comprising a plurality of optical fibers operable in an infrared spectrum to transfer infrared energy longitudinally along said fibers, a support member and means for rotating said support member, said fibers being mounted on said member in a generally spoke-like configuration with the outer ends of said fibers defining a generally cylindrical surface and with the outer ends of each fiber displaced longitudinally and circumferentially of said surface from the outer end of adjacent fibers in a generally helical path on said surface.

10. An image scanning wheel comprising a plurality of optical fibers operable to transfer energy longitudinally along said fibers, a support member and means for rotating said support member, said fibers being mounted on said member in a generally spoke-like configuration with the outer ends of said fibers defining a generally cylindrical surface and with the outer ends of each fiber displaced longitudinally and circumferentially of said surface from the outer end of adjacent fibers in a generally helical path on said surface.

References Cited

UNITED STATES PATENTS

| | | | |
|---|---|---|---|
| 1,825,781 | 10/1931 | Dawson | 350—96 |
| 3,088,033 | 4/1963 | Kaufold | 250—83.3 |

RALPH G. NILSON, *Primary Examiner.*

M. J. FROME, *Assistant Examiner.*